Patented Nov. 19, 1929

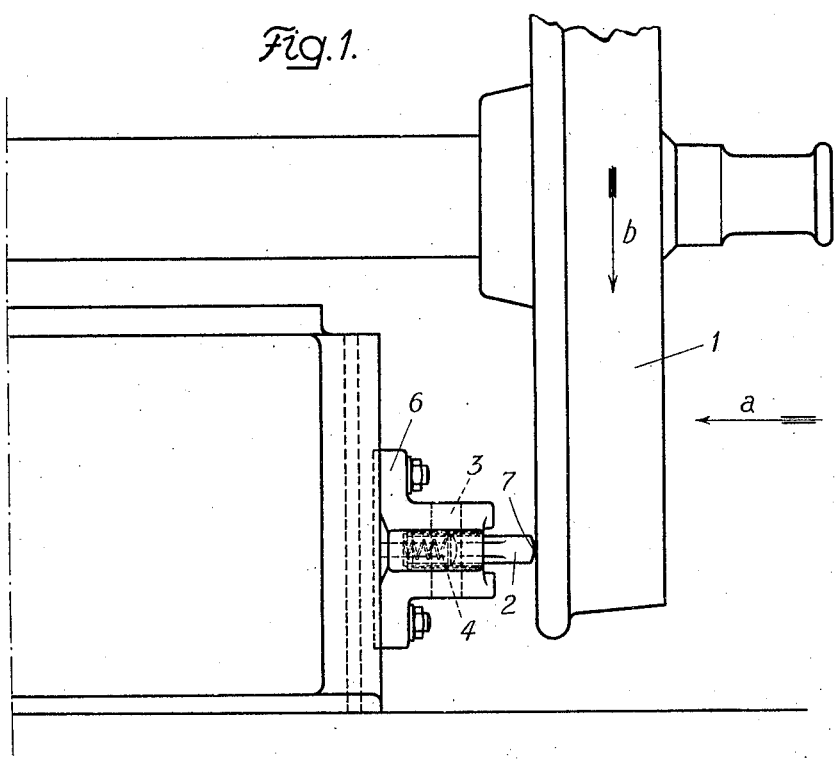
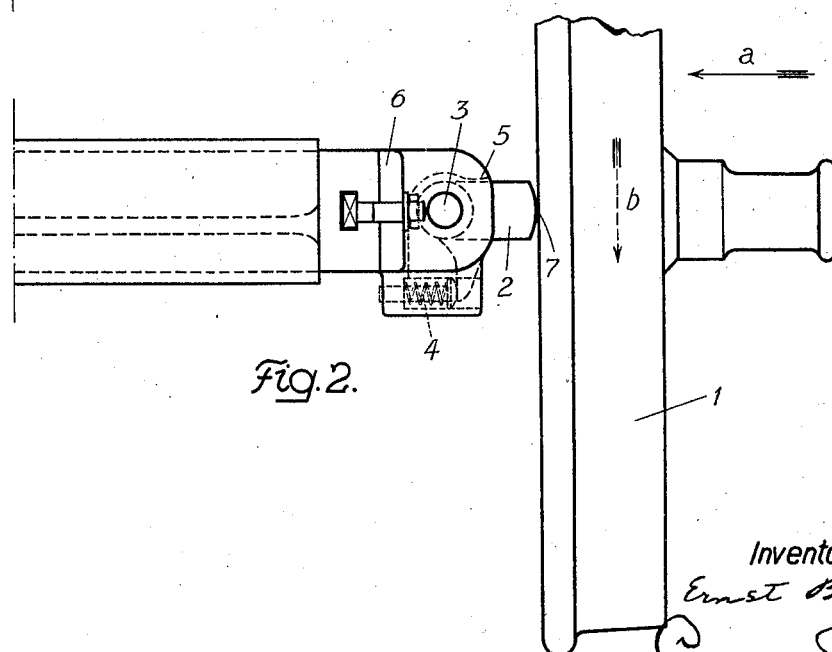

1,736,694

UNITED STATES PATENT OFFICE

ERNST BLAU, OF BERLIN, GERMANY

STOP FOR LOCATING WORK IN MACHINE TOOLS

Application filed February 4, 1929, Serial No. 337,388, and in Germany February 4, 1928.

This invention relates to stops for locating in machine tools the work or article to be machined thereby and particularly to stops of the kind in which a member is adjustably mounted in a fixed support to engage the work and determine its position when the work is set up on the machine.

The object of this invention is to provide a stop which need not be moved away from the work either by hand or by some suitable mechanism as hitherto before the cutting operation is started.

A stop according to this invention comprises an adjustable abutment member so mounted and arranged on some stationary part of the machine that when the work is set in motion the stop is automatically deflected thereby into an inoperative position. The abutment member may be pivotally mounted and so arranged that while it firmly engages the work when the latter is correctly located but stationary, it is deflected as soon as the work is set in motion after which there is a sliding or rolling engagement between the abutment and work. Alternatively, the abutment may be in the form of a cam or eccentric mounted on some stationary part of the machine so that the face of the cam is in engagement with the work.

Preferably the abutment member is provided with a spring or other means which tends to return it to the operative position as soon as the work is removed.

One construction of work stop according to this invention and as applied to a lathe, is illustrated by way of example in the accompanying drawings, in which Figure 1 is a side elevation, and

Figure 2 is a plan.

The work to be machined 1 is introduced into the lathe in the direction of the arrow $a$ and ultimately strikes during that introduction a lever-like abutment 2 which can pivot about a pin 3 and in its initial position is pressed by a spring-controlled pin 4 against a projection 5 of an adjustable carrier 6 mounted on the fixed portion of the lathe. When the work 1 is rotated in the direction of the arrow $b$ the lever 2 will roll with its end 7 on the work 1 and during the whole time during which the work is being machined will, under the pressure of the spring-controlled pin 4, lightly engage the work 1.

It will be appreciated that a stop according to this invention may be arranged in various ways, for example, the abutment member may be such that during the movement of the work the member rolls or moves against the pressure of the return spring in a plane oblique to the axis of the work or the abutment member may be eccentrically moved away from the work when this is set in motion. Further, the device may be arranged so that after a predetermined deflection of the abutment member has occurred, complete disengagement automatically takes place, reengagement being effected either automatically or by hand when the work is removed.

It will be seen that while the abutment member bears against the work with some considerable pressure when the work is first located in position, this pressure is reduced to a negligible quantity immediately the work is set in motion.

What I claim is:—

1. In a machine tool a stationary support and an abutment member so mounted thereon as normally to assume an operative position to engage the work and locate it when the work is stationary, such abutment automatically moving relatively to its support into an inoperative position when the work is in motion.

2. In a machine tool the combination of a fixed support of an abutment member pivotally mounted thereon, said abutment normally occupying an operative position to engage the work and locate it when said work is stationary but automatically turning about its pivot to occupy a different angular and relatively inoperative position when the work is in motion.

3. In a machine tool the combination of a stationary portion of the machine, an abutment member pivotally mounted thereon and means normally tending to move the abutment member into an operative position to engage the work and locate it when the work is stationary said means yielding and permitting the abutment automatically to move into an inoperative position when the work is in motion.

4. In a machine tool the combination of a stationary part of the machine, an abutment member pivotally mounted thereon, a spring tending to retain the abutment in a plane where it engages and locates the work when said work is stationary, the abutment automatically turning upon its pivot against the action of the spring when the work is in motion to occupy a different plane where it is relatively inoperative.

5. In a machine tool the combination of a stationary part of the machine, a cam-like member pivotally mounted thereon and means tending to hold the cam in operative engagement with the work to locate the work when the latter is stationary, said cam rotating about its pivot when the work is in motion so as to occupy a different angular and relatively inoperative position.

6. In a machine tool the combination of a stationary part of the machine, a cam-like member pivotally mounted thereon and a spring tending to hold the cam in operative engagement with the work to locate the work when the latter is stationary, said cam rotating about its pivot against the action of the spring when the work is in motion so as to occupy a different angular and relatively inoperative position.

In testimony whereof I affix my signature.

ERNST BLAU.